United States Patent Office 3,243,307
Patented Mar. 29, 1966

3,243,307
HYDRAULIC CEMENT MORTAR COMPOSITIONS
George Selden, Cleveland Heights, Ohio, assignor, by mesne assignments, to Tile Council of America, Inc., New York, N.Y., a corporation of New York
No Drawing. Filed Apr. 19, 1961, Ser. No. 103,966
3 Claims. (Cl. 106—93)

This invention relates to hydraulic cement mortar compositions particularly adapted for use in grouting and setting tile.

Unless otherwise indicated all percentages herein are on a weight basis.

Conventional cement mortars, containing Portland cement, sand and water added in amount to obtain the workability and to effect gel formation during curing have good bonding properties, non-flammability, resistance to attack by rodents, insects and fungi and other desirable properties. They also have the known disadvantage that for tile setting purposes relatively thick layers are required with consequent excessive labor entailed in mixing, placing and troweling to produce such thick layers.

The addition of small amounts of methyl cellulose up to about 6.5% to cement mortars for the purpose of forming a mixture, which can be applied in a relatively thin layer has been suggested (United States Patent 2,934,932).

It is a principal object of the present invention to improve such hydraulic cement mortars to produce mortars which can be applied in thin layers and yield good bonds or adhesion when set, which thin-set mortars are eminently satisfactory for use in grouting and setting tile including ceramic tile and absorptive tile.

Other objects and advantages of this invention will be apparent from the following description thereof.

In accordance with this invention, a dry mix for producing thin-set hydraulic cement mortars having good water retentive properties, good bonding properties and flow characteristics is produced by mixing with the hydraulic cement which may consist of Portland cement with or without sand and with or without other additives such as glycerin, perfume and polyvinyl alcohol, a small amount, up to a maximum of about 4%, of hydroxyethyl cellulose.

Hydroxyethyl cellulose containing hydraulic cement mortars, I have found, have better water retentive properties than mortars containing a like amount of methyl cellulose. Hydroxyethyl cellulose in amount of 90% by weight of the amount of methyl cellulose, gives a hydraulic cement mortar having equivalent strength; thus on a weight basis, 10% less hydroxyethyl cellulose gives the same strength bonding of non-porous and porous tiles. A further advantage of mortars containing hydroxyethyl cellulose is that they can be applied to form thin layers say about ⅛" or less over a wide range of temperatures, including temperatures from 100° to 110° F. and this without the necessity of incorporating urea in the mortars. See United States Patent 2,959,489.

The hydroxyethyl cellulose used may be any of the available commercial hydroxyethyl celluloses including Natrasol and Cellosize. Low (above 400 cps.), medium, or high viscosity grades of hydroxyethyl cellulose can be used. The lower viscosity hydroxyethyl cellulose is less economical to use because more is required to produce the desirable properties described above. From a practical standpoint, therefore, the higher viscosity hydroxyethyl celluloses are preferred since on an equal weight basis they exhibit better water-retaining properties and somewhat better shear strength. Viscosities in the range of from about 3,000 to about 30,000 cps., preferably from about 10,000 cps. to about 25,000 cps., give good workability with relatively larger quantities of water, about 35% based on the weight of the solid constituents of the mortar. Viscosity values given in this specification, refer to the viscosities of 2% by weight solutions in water at 25° C.

The amount of hydraulic cement may be as high as 99.4% in the case of a mortar containing only hydraulic cement and hydroxyethyl cellulose to about 24% in the case of mortars containing sand and other constituents. Sand, if used, should be present in the amount of from one to three volumes of sand per volume of hydraulic cement. For setting porous tiles a mixture containing equal volumes of hydraulic cement and sand up to one volume of hydraulic cement per 1½ volumes of sand produce a mortar which is entirely satisfactory.

The preferred dry mortar composition, contains finely divided inorganic fibers, such for example as mineral wool, glass fibers, and the like, in amount of from 1 to 2%. The incorporation of the inorganic fibers improves the thixotropic properties of the mortar, i.e. the use of inorganic fibers prevents sag of the mortar. Using a mortar containing inorganic fibers to bond ceramic tile on a vertical wall, the tile will not tend to slip down the wall during setting of the mortar. In the case of mortar not containing inorganic fibers, it is necessary to first bond the lowermost row of tile to the wall and then bond the successively higher rows so that an underlying row prevents sag or travel of a higher tile on the wall.

The constituents are mixed dry in any suitable mixing equipment which will give a uniform and homogenous mixture, desirable at room temperatures. Usual additives may be incorporated in the mixture. For example, polyvinyl alcohol in small amount, usually about 0.1% to 2%, based on the weight of the hydraulic cement, can be added to increase adhesion and bond strength, reduce shrinkage and attain better workability. Small amounts of perfume desirably carried on suitable inert carrier, with or without alcohol to disperse the perfume can be added for esthetic reasons.

Thus the novel thin-set hydraulic cement dry mixture of this invention consists essentially of from 24% to 99.4% hydraulic cement; from 0.6% to 4% hydroxyethyl cellulose, preferably from 0.6% to 2%; from 0% to 75% sand; from 0% to 2% inorganic fiber; and small amounts of other conventional additives, for example, perfume, glycerine, polyvinyl alcohol, etc.

This dry mixture when added to water forms a thin-set mortar. The amount of water used is such that the resultant mixture will not slide down a wall or drop off a ceiling when applied. In general from about 25% to 35% or 40% water by weight, based on the weight of the dry mixture, gives good results.

The following examples are given to illustrate thin-set dry mixes embodying this invention. It will be appreciated that the invention is not limited to these examples.

*Example 1*

| | Percent |
|---|---|
| Hydroxyethyl cellulose viscosity 3,500–6,500 cps. | 1.2 |
| Inorganic fiber | 1.7 |
| Hydraulic cement | 97.1 |
| Total | 100 |

*Example 2*

| | Percent |
|---|---|
| Hydroxyethyl cellulose viscosity 15,000 cps. | .6 |
| Hydraulic cement | 99.4 |
| Total | 100 |

Example 3

| | Percent |
|---|---|
| Hydroxyethyl cellulose viscosity 15,000 cps. | 1 |
| Polyvinyl alcohol | 1 |
| Hydraulic cement | 48 |
| Sand | 49 |
| Inorganic fiber | 1 |
| Total | 100 |

In the above examples, the constituents are mixed dry and the dry mixture is mixed with water in amount to produce a mortar which will remain on a hawk (a plasterer's tool). Approximately two gallons of water are mixed with 40 pounds of the dry mixture; a high strength thinset mortar results.

The mortars of this invention have the advantage, among others, over mortars heretofore known containing methyl cellulose, that they require an appreciably smaller amount of hydroxyethyl cellulose as compared with the amount of methyl cellulose, to produce equivalent high-strength mortars. Moreover as noted, mortars containing hydroxyethyl cellulose can be applied over a wide temperature range including temperatures of 100° to 110° F. and result in bonds of high shear strength.

Since changes in the dry mixes of this invention could be made without departing from the scope of this invention, it is intended that all matter contained in the above description shall be interpreted as illustrative and not in a limiting sense.

What is claimed is:

1. A dry mortar-forming composition consisting essentially, by weight, of about 1.2% hydroxyethyl cellulose having a viscosity of about 15,000 cps. as a 2% by weight solution in water at 25° C., about 1.7% finely divided inorganic fibers and about 97.1% hydraulic cement.

2. The dry mortar-forming composition consisting essentially, by weight, of from above 0.6% to 4% of hydroxyethyl cellulose having a viscosity of from 400 to 30,000 cps. as a 2% by weight solution in water at 25° C.; from 0% to 2% inorganic fiber; and from 24% to 99.4% hydraulic cement, the amount of hydroxyethyl cellulose within said range of from above 0.6% to 4% being near the upper portion of said range when employing a hydroxyethyl cellulose having a viscosity in the lower portion of said range of from 400 to 30,000 cps. and such that the dry composition when water is added thereto in amount of from 25% to 40% by weight based on the weight of the dry composition produces a mortar that can be applied in thin layers for setting tile on walls and ceilings, which layer will not tend to slip during setting of the mortar and when set will firmly bond the tile to the walls and ceilings.

3. A dry mortar composition consisting, by weight, from above 0.6% up to 4% hydroxyethyl cellulose, having a viscosity of from 3,000 to 30,000 cps. as a 2% by weight solution in water at 25° C., from 0% to 75% sand, from 24% to 99.4% hydraulic cement and from 0% to 2% inorganic fibers, the amount of said hydroxyethyl cellulose within said range being such that the dry composition when water is added thereto in amount of from 25% to 40% by weight based on the weight of the dry composition produces a mortar that can be applied in thin layers for setting tile on walls and ceilings, which layer will not tend to slip during setting of the mortar and when set will firmly bond the tile to the walls and ceilings.

References Cited by the Examiner

UNITED STATES PATENTS

| 2,580,565 | 1/1952 | Ludwig | 106—93 |
| 2,738,285 | 3/1956 | Biefield et al. | 106—99 |

TOBIAS E. LEVOW, *Primary Examiner.*

JOSEPH REBOLD, *Examiner.*

J. B. EVANS, J. E. POER, *Assistant Examiners.*